United States Patent [19]

Saitoh et al.

[11] Patent Number: 5,572,538
[45] Date of Patent: Nov. 5, 1996

[54] LASER APPARATUS AND ACCESSIBLE, COMPACT COOLING SYSTEM THEREOF HAVING INTERCHANGEABLE FLOW RESTRICTING MEMBERS

[75] Inventors: Minoru Saitoh; Akira Uesugi; Takahiro Uchida, all of Chiba-ken, Japan

[73] Assignee: Miyachi Technos Corporation, Chiba-ken, Japan

[21] Appl. No.: 4,581

[22] Filed: Jan. 14, 1993

[30] Foreign Application Priority Data

Jan. 20, 1992 [JP] Japan ................................. 4-006378
Jan. 21, 1992 [JP] Japan ................................. 4-006360
Jan. 21, 1992 [JP] Japan ................................. 4-030168

[51] Int. Cl.$^6$ ................................................ H01S 3/04
[52] U.S. Cl. ................................................ 372/34; 372/35
[58] Field of Search ........................ 372/34, 35; 138/40, 138/46, 48, 94; 137/10; 251/214

[56] References Cited

U.S. PATENT DOCUMENTS

| | | | |
|---|---|---|---|
| 2,422,801 | 6/1947 | Rohling | 138/94 X |
| 2,580,595 | 1/1952 | Renfro | 138/94 X |
| 3,730,773 | 5/1973 | Graber | 138/46 |
| 4,291,282 | 9/1981 | Alfano et al. | 372/35 X |
| 4,402,341 | 9/1983 | Reip | 137/489 |
| 4,501,949 | 2/1985 | Antol et al. | 219/121 LC |
| 4,507,789 | 3/1985 | Daly et al. | 372/35 X |
| 4,660,209 | 4/1987 | Osada et al. | 372/34 X |
| 4,730,332 | 3/1988 | Hoag | 372/34 X |
| 5,213,086 | 5/1993 | Sims | 123/514 |

OTHER PUBLICATIONS

Paul Horowitz and Winfield Hill, *The Art of Electronics* (Cambridge University Press 1980), pp. 548–549.

Primary Examiner—Rodney B. Bovernick
Assistant Examiner—Hemang Sanghavi
Attorney, Agent, or Firm—Wenderoth, Lind & Ponack

[57] ABSTRACT

A laser apparatus includes an electric power supply system and a cooling water supply system. Both the electric terminals of the electric power supply system for connection with an external power cable and ports of the cooling water supply system for communicating with external pipes are placed in the forward part of the laser apparatus for facilitating its maintenance. A storage tank stores cooling water to be supplied to a laser oscillator. Both an ion exchanger and a filter are commonly housed in the tank to downsize the apparatus, to minimize the water leakage and to effectively purify the cooling water. Interchangeable flow control valves are provided for different electric power frequencies. According to the available power frequency an appropriate one of the valves is chosen and connected to internal piping to achieve the desired flow rate of the cooling water supplied to the laser oscillator.

4 Claims, 8 Drawing Sheets

LASER APPARATUS AND ACCESSIBLE, COMPACT COOLING SYSTEM THEREOF HAVING INTERCHANGEABLE FLOW RESTRICTING MEMBERS

BACKGROUND OF THE INVENTION

This invention relates to a laser apparatus including electric power supply system for supplying electric power to a laser oscillator and a cooling water supply system for supplying cooling water to the laser oscillator.

An example of such a laser apparatus is a laser beam machining apparatus. The laser beam machining apparatus employs a high power supply to obtain a high laser output from the laser oscillator. To increase the laser oscillation efficiency and stabilize the laser performance, the laser beam machining apparatus includes a cooling water supply including a storage tank and a pump for forcedly cooling the laser oscillator with cooling water.

The electric power and cooling water supply systems are externally supplied with a required electric power, signals and primary cooling water and required outputs signals and drainage water. A solid state laser apparatus such as a YAG laser uses pure cooling water having a high electric insulation since the cooling water passes through an electrode of the pumping lamp within the laser oscillator. To maintain the purity of the cooling water, an ion exchanger and a filter are included in the cooling water supply system. Such an ion exchanger and filter are consumable parts and must be regularly replaced.

FIG. 12 shows an overall arrangement of a prior art appratus for cooling a solid state laser oscillator. In the cooling apparatus, cooling water is pressurized by a pump 202 and circulates through a storage tank 200, filter 204, laser oscillator 206, heat exchanger 208 and ion exchanger 210 by way of pipes. Within the laser oscillator 206, the cooling water passes through glass tubes respectively containing a laser rod and a pumping lamp, and through a water passage disposed in the oscillator block.

The water flowing out of the laser oscillator 206 is cooled by the heat exchanger 208 and returns to the storage tank 200. Most of the cooling water drawn by the pump 202 from the tank 200 is supplied to the laser oscillator 206 through the filter 204 whereas the remaining fraction of the water passes through the ion exchanger 210 which deionizes the cooling water so that purified water is fed back to the tank 200. The ion exchanger 210 is of a cartridge type only allowing a limited flow of water to pass therethrough. Due to the flow limitation, the ion exchanger 210 is connected in shunt with the laser oscillator 206, so that the ion exchanger 210 receives only a fraction of the cooling water drawn by the pump.

Flow control valves 212 and 214 are connected in series and in parallel, respectively, with the ion exchanger 210. A thermosensor 216, pressure sensor 218 and electric conductivity sensor 220 are connected in the pipeline between the pump 202 and the laser oscillator 206 to monitor the temperature, pressure and electric conductance, respectively, of the cooling water supplied to the laser oscillator 206. Reference numeral 222 denotes an electric motor for driving the pump, 224 denotes a flow switch, 226 denotes a tank drain, and 228 denotes an electromagnetic valve.

In the prior art laser apparatus of this kind, a visual display and a keyboard are disposed on the front panel of the apparatus whereas those parts for which maintenance, repair, connecting and exchange are required, such as the external electric connecting terminal circuit breaker of the power supply, external pipeline connecting port, tank, ion exchanger and filter, of the cooling water supply are disposed on the back of the apparatus.

Thus, maintenance personnel must gain access to the back of the apparatus when repair, wiring and/or parts exchange is required. The apparatus of this kind is normally installed with its back against a building wall. To do the maintenance work, the apparatus must be moved to a place spaced well away from the building wall.

Although it is about the size of household refrigerator, the laser beam machining apparatus is much heavier than the household refrigerator. A typical YAG laser apparatus (including laser oscillator, power supply and cooling system) weighs about 250 to 350 kilograms. For portability, the laser apparatus has casters on the bottom thereof. Frequent movement of such apparatus not only requires a sufficient space around the apparatus but also can cause errors and failures due to vibration in the optical system of the laser oscillator.

The prior art laser oscillator cooling apparatus is large because of the considerable space occupied the filter 204 and the ion exchanger 210 for maintaining purity of the cooling water in addition to indispensable components including the storage tank 200, pump 202, motor 222 and heat exchanger 208. The provision of the filter 204 and the ion exchanger 210 complicates the pipes, joints and fittings, increasing the cost and causing leakage of water because of the increased number of connecting points.

The flow limitation of the cartridge type ion exchanger 210 requires that only a fraction of the cooling water drawn by the pump 202 passes to the ion exchanger 210 that an ion exchanging process is performed bit by bit. Thus, the ion exchanging efficiency is reduced. Although a plurality of ion exchangers may be provided in parallel to increase the ion exchanging efficiency, this involves increasing the number of pipes and joints as well as the ion exchangers, .thus entailing further serious problems of increased cost and leakage of water.

The performance of solid state laser oscillators is seriously influenced by the cooling effect. A slight temperature change in the supplied cooling water can result in a large change in the laser output. In this regard, a thermal control means is provided in the tank 200 to maintain the temperature of the cooling water.

The temperature keeping control is not enough to provide a stable operation of the laser oscillator. It is necessary to add a flow control means which controls the flow of the cooling water. A constant cooling effect is obtained by maintaining both the temperature and the flow of the cooling water.

In the prior art cooling apparatus, however, a revolution speed change of pump 202 due to changeover between different electric commercial power frequencies (50 Hz, 60 Hz) has caused a change in the flow rate, resulting in an unsatisfactory operation of the laser oscillator 206. To overcome the problem, an adjustable flow control valve is used for the valve 214 to adjust the flow rate in correspondence with the available commercial power frequency. However, the adjusting work is complicated and troublesome.

SUMMARY OF THE INVENTION

It is, therefore, an object of the invention to provide a laser apparatus for which maintenance work of wiring, connecting, repair, exchange etc., can be made without requiring moving the apparatus.

Another object of the invention is to down-size the prior art apparatus and simplify or reduce the number of the pipes and joints thereof to provide a less expensive and more reliable laser system.

A further object of the invention is to provide a laser oscillator cooling apparatus capable of maintaining the flow rate of the cooling water to be supplied to the laser oscillator irrespective of the rotational speed of the pump to thereby assure satisfactory operation of the laser oscillator.

To achieve these objects of the invention there is provided a laser apparatus which comprises a laser oscillator, power supply means for supplying electric power to the laser oscillator, and cooling means for supplying cooling water to the laser oscillator, an external electric connecting terminal of the power supply means being disposed at the front of the laser apparatus, and an external pipe connecting port of the cooling means being disposed at the front of the laser apparatus.

Thus, maintenance, such as connecting an external power system to the electric connecting terminal and fitting the pipes of the cooling means to the piping of external cooling water supply and drainage systems, can readily be done once the door or cover on the front of the apparatus is opened. In other words, the maintenance personnel do not need to access the back of the apparatus or to move it.

In accordance with another aspect of the invention, there is provided a system for cooling a laser oscillator by circulating cooling water through a circuit including the laser oscillator, an ion exchanger and a filter, the system comprising a storage tank for storing the cooling water to be supplied to the laser oscillator, the storage tank containing the ion exchanger and the filter.

In operation, the cooling water enters the ion exchanger directly from the inlet of the storage tank. The ion exchanger deionizes the cooling water to recover its purity. After passing through the ion exchanger, the cooling water held in the tank communicates directly (through no pipe) with the filter within the tank. The filtered cooling water is drawn out of the tank through the filter outlet to be supplied to the laser oscillator.

With this arrangement, the tank serves as a common housing for the ion exchanger and the filter so that the tank inlet functions as an inlet of the ion exchanger whereas the tank outlet functions as an outlet of the filter. Accordingly, the cooling apparatus does not require separate housings dedicated for the ion exchanger and the filter, respectively, additional space therefor, or pipes and joints associated therewith.

The storage tank may be made from a transparent material to permit visual inspection of the water level, ion exchanger etc., within the tank.

In accordance with a further aspect of the invention, there is provided an apparatus for cooling a laser oscillator with cooling water, which comprises a storage tank for storing the cooling water, a pump for pumping the cooling water, a piping connecting the laser oscillator, the storage tank and the pump, and flow restricting means connected in the piping for restricting the flow of the cooling water to a degree corresponding to the rotary speed of the pump.

The provision of a flow restricting member in the piping establishes a flow rate (flow per unit time) as a function of the area occupied by the member in a cross-sectional plane of the water passage pipe. On the other hand, the rotational speed of the pump is in proportion to the frequency of electric power to the driving motor of the pump. Thus, the rotational speed with a 60 Hz power frequency is higher than that with a 50 Hz power frequency so that the former produces a higher water supply pressure.

In accordance with the invention, in the case of a 50 Hz power frequency, a flow restricting member having a relatively low flow limiting degree is installed in the piping whereas, for a 60 Hz power frequency, another flow restricting member having a relatively high flow limiting degree is mounted. By choosing an appropriate flow limiting degree ratio of these interchangeable flow restricting members, the same flow rate is obtained in both cases of 50 and 60 Hz power frequencies. In doing so, the cooling effect on the laser oscillator is kept constant, independent of the power frequencies, thus achieving a uniform operation of the laser oscillator.

BRIEF DESCRIPTION OF THE DRAWINGS

The above and other objects, features and advantages of the invention will become more apparent from the following description taken in conjunction with the drawings in which.

DETAILED DESCRIPTION OF THE PREFERRED EMBODIMENT

Figure 1:
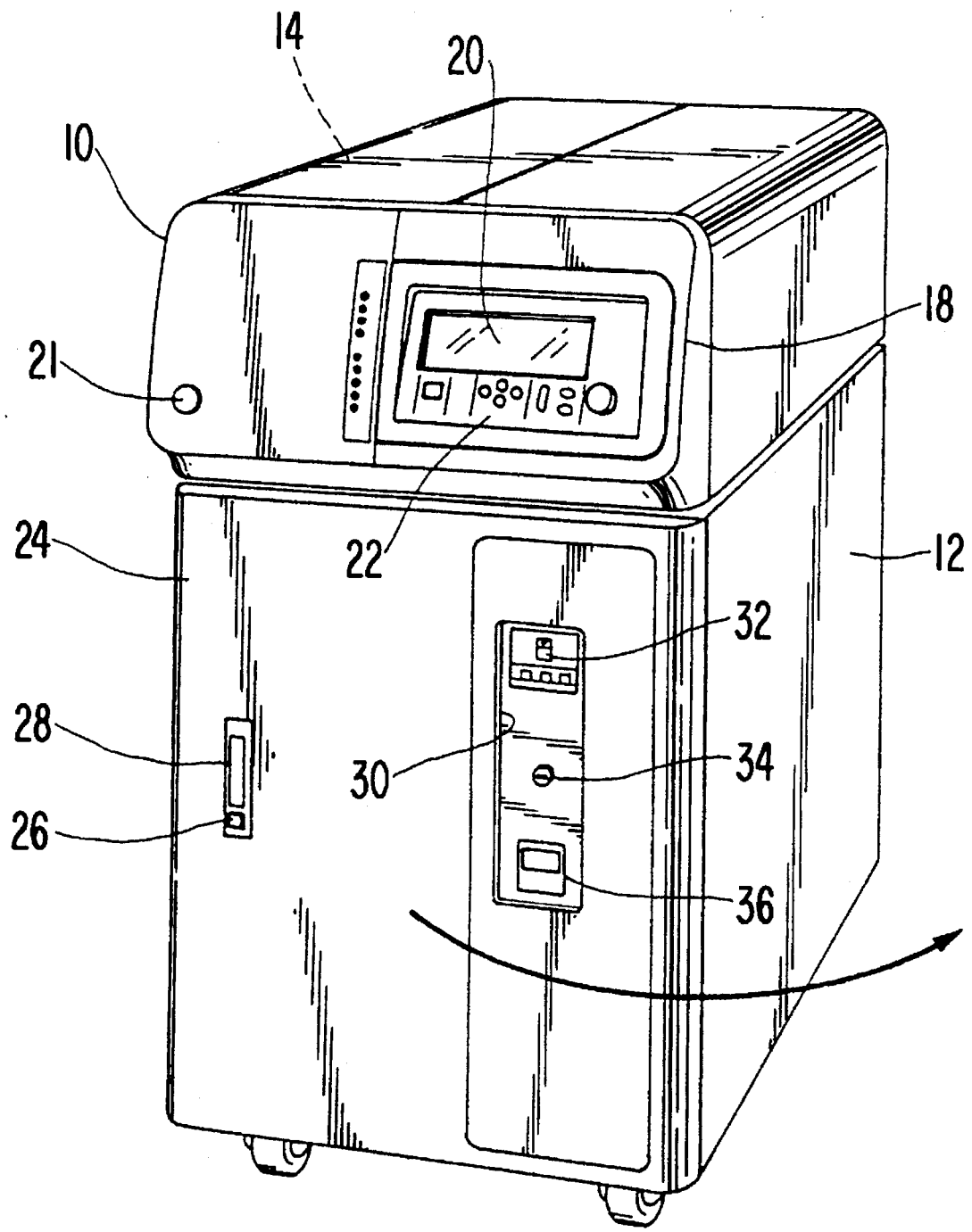
FIG. 1 is a perspective view of one embodiment of a laser beam machining apparatus in accordance with the invention.

Referring first to FIG. 1, a laser beam machining apparatus of the invention includes of upper unit 10 and a lower unit 12 integral therewith. The interior of the upper unit 10 is divided by a partition wall into left and right parts. A laser oscillator 14 is contained in the left part whereas an optical fiber incident unit and control circuit boards of an electric power supply system are incorporated in the right part. Disposed on a front panel 18 of the upper unit 10 are a display 20 for visually displaying various settings, measurements and monitored values, various key switches 22, and an emergency stop button 21.

The lower unit 12 contains a power circuit, an internal connecting terminal and a circuit breaker, of the power supply system, and a tank, pump, heat exchanger, ion exchanger, filter and external pipe connecting terminal of a cooling water supply system. The front panel 24 of the lower unit 12 takes the form of a door. Pressing a button 26 on the left causes a knob 28 to move forward. Drawing the knob 28 opens the front panel door 24 in a direction of the arrow. A window 30 is formed in the front panel 24. Through the window 30, the circuit breaker 32 and key switch 34 of the power supply, and a thermometer 36 of the cooling water supply are exposed.

Figure 2:
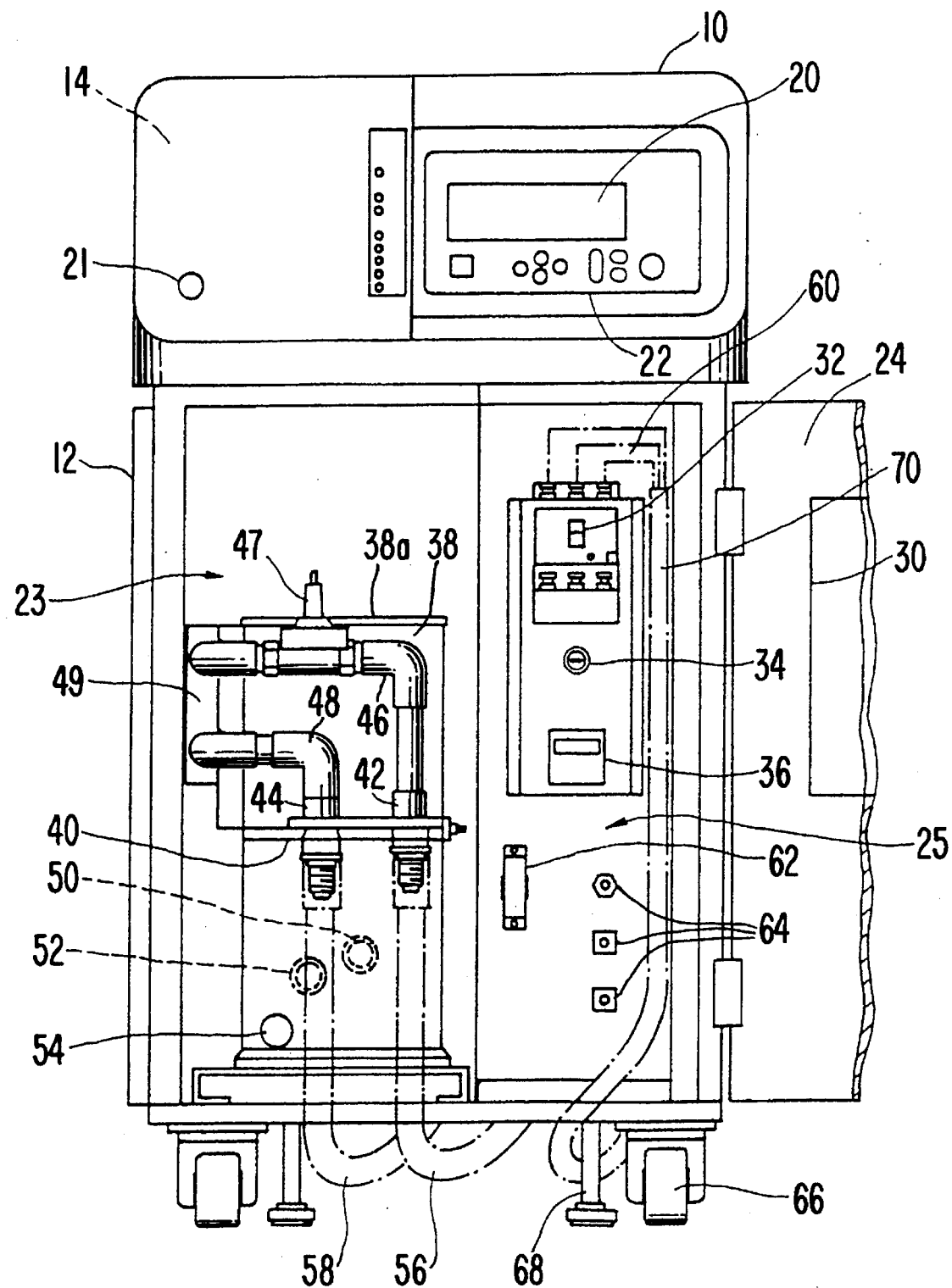
FIG. 2 is a front view of an interior of the laser beam machining apparatus with its front door open in accordance with the invention.

FIG. 2 shows the interior of the lower unit 12, from the front when the front panel door 24 is open. The interior of the lower unit 12 is subdivided by a partition wall into left and right sides. A main part of the cooling water supply system 23 is placed on the left side whereas a main part of the electric power supply system 25 is arranged on the right side. The storage tank 38 of the cooling water supply system 23 which holds (secondary) cooling water to be supplied to the laser oscillator 14 is mounted on the front portion of the laser apparatus. The tank 38 contains an ion exchanger and a filter each disposed underwater in the tank.

A support board 40 is fixed on the front of the tank 38. The board 40 supports a commercial water supply port 42 and a commercial water drain port 44, each defining an external pipe connecting port. The commercial water supply and drain ports 42 and 44 are connected to pipes 46 and 48, respectively, which communicate with a primary inlet and outlet, respectively, of an internal heat exchanger (not shown). These pipes 46 and 48 extend along the front and side of the storage tank 38, as shown. A support board 49 having openings through which the pipes 46 and 48 pass is fixed on the side of the tank 38. An electromagnetic valve 47 is connected in the pipe 46 to control the commercial water flow for the heat exchanger.

A secondary inlet of the heat exchanger communicates with an outlet of the laser oscillator 14 via a pipe line (not shown). A secondary outlet of the heat exchanger is connected to an inlet 50 of tank 38, formed on the back of the tank via a line (not shown). An outlet 52 of the tank 38 is also formed on the back of the tank. The tank outlet 52 is connected to an inlet of an internal pump (not shown) by a pipe (not shown). A pump outlet communicates with an inlet of the laser oscillator 14 via a pipe (not shown).

The cooling water flowing into the tank 38 via the inlet 50 from the secondary outlet of the heat exchanger is first processed by the submerged ion exchanger which removes ions from the cooling water. After passing through the ion exchanger, the cooling water stays within the tank 38. Then, the cooling water passes through the filter in the tank and is drawn out of the tank 38 through the outlet 52 by the pump.

In the present laser beam machining apparatus, the cooling water storage tank 38 is disposed in the forward part of the apparatus. The storage tank 38 contains the ion exchanger and the filter. Thus, the ion exchanger and the filter can be readily replaced by opening the cover 38a of the tank 38 to access the forward part of the apparatus.

A drain port 54 is formed on the front surface of the tank 38 to allow the cooling water to be drained. When a draining of the cooling water is required, the drain port 54 is connected to an external drain pipe. The commercial water (primary cooling water) supply port 42 is connected to a faucet (not shown) by an external pipe 56 shown by a dashed line. The commercial water drain port 44 is connected to a drain tank or channel (not shown) by an external pipe 58 shown by a dashed line.

In the present laser beam machining apparatus, the external pipe connecting port defined by the commercial water supply and drain ports 42 and 44, and cooling water drain port 54 is disposed at the front part of the apparatus. Thus, maintenance personnel do not have to access the rear of the apparatus or to move the apparatus. The maintenance work including setting, inspection and repair can easily be done from the front of the apparatus.

In the power supply system 25, a forward support plate 60 carries an external connecting terminal including an I/O connector 62 and control/external communication connector 64 in addition to the circuit breaker 32 and the key switch 34. A power cable 70 shown by a dashed line is connected to a primary terminal of the circuit breaker 32 on the forward support plate 60. The maintenance personnel do not need to access the back of the apparatus but simply can open the front door 24 to inspect the circuit breaker 32 and/or do the wiring for electrically connecting the laser apparatus and an external apparatus. Various manipulations other than the maintenance can also be done from the front of the laser apparatus.

The upper and lower units 10 and 12 of the laser apparatus are each subdivided by a partitioning wall into left and right sides in which the laser oscillator 14 to be cooled by the cooling water and the cooling water supply 23 and the electric system including the control circuit boards and the power supply 25 are contained, respectively. Thus, should water leak in the laser oscillator 14 or the cooling water supply 23, the electric system will not be affected because of the isolation of the left and right sides.

Casters 66 and stoppers 68 are attached to the bottom of the laser apparatus. The maintenance of the laser apparatus is done in front of the laser apparatus with its front door 24 open. Thus, the stoppers 68 are used to install the laser apparatus in place whereas the casters 66 are used to move the laser apparatus into or out of that place.

Some laser apparatus use cooling water to cool the power supply system 25 in addition to cooling the laser oscillator. In such a case, an external cooling water pipe connecting port of the power supply system is disposed at the front of the laser apparatus, and may be juxtaposed with the external cooling water pipe connecting ports 42 and 44 of the laser oscillator or may be bypassed to the commercial water supply pipe 46. The front panel 24 may take the form of a removable cover instead of a door.

The laser oscillator cooling apparatus of the invention will now be described in more detail with reference to FIGS. 3 to 6. The cooling apparatus comprises a cooling water supply passage leading to the laser oscillator 14, disposed in the left part of the upper unit 10, and a cooling water supply 23 including the storage tank 38 etc. and disposed in the left part of the lower unit 12.

Figure 3:
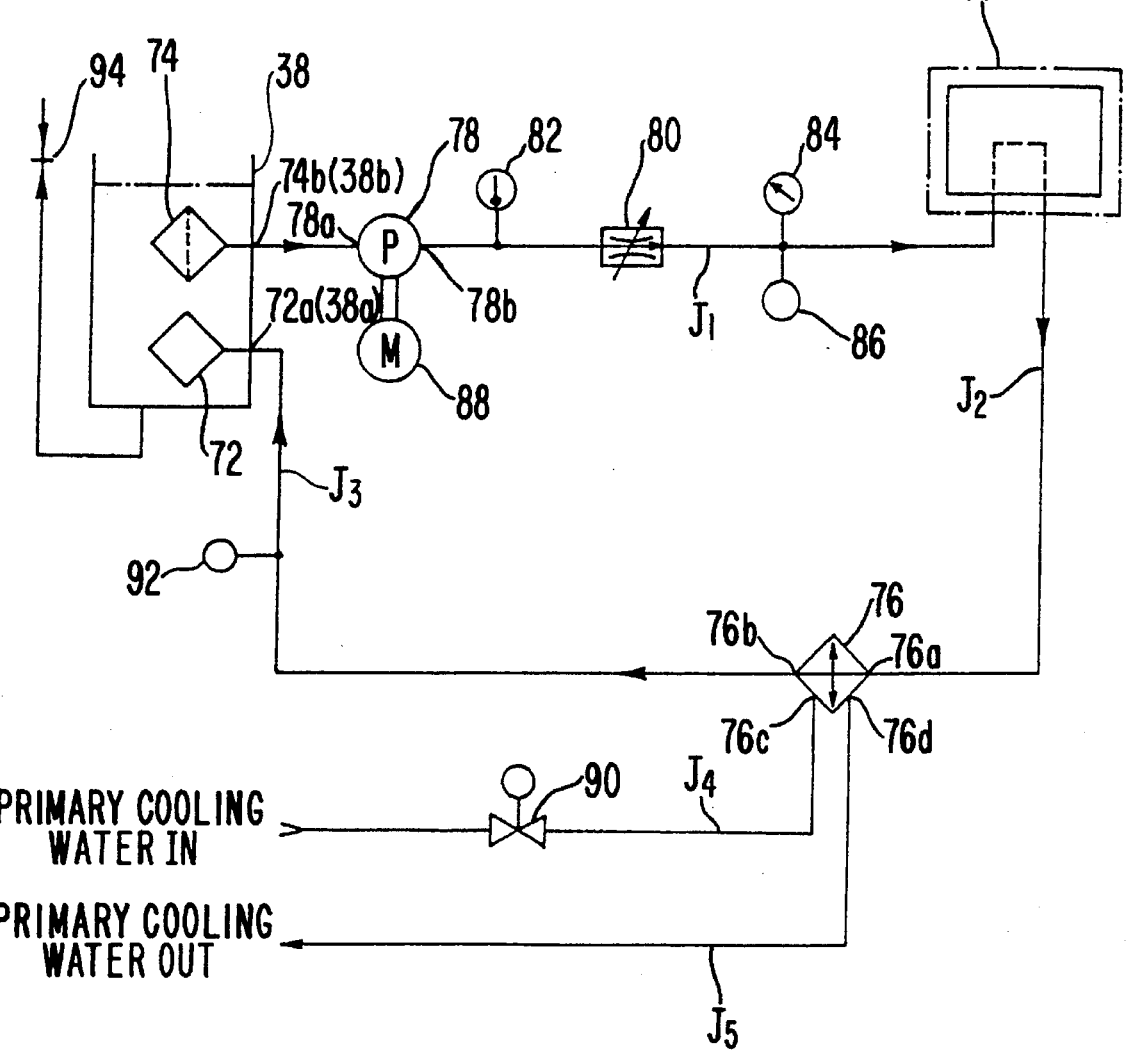
FIG. 3 is a block diagram of a solid state laser oscillator cooling apparatus in accordance with the invention.

Referring to FIG. 3, the storage tank 38 stores a cooling water to be supplied to the laser oscillator 14. Within the tank 38, an ion exchanger 72 and a filter 74 are disposed underwater. An inlet 72a of the ion exchanger 72 which serves as the inlet 38a of the tank 38 communicates with an outlet 76b of a heat exchanger 76. An outlet 74b of the filter 74 serving as the outlet 38b of the tank 38 is connected to an inlet 78a of a pump 78.

The cooling water from the outlet 78b of the pump 78 has a temperature of, say, about 28–30 degrees centigrade, and is supplied to the laser oscillator 14 through an interchangeable flow restricting valve 80. Within the laser oscillator 14, the cooling water passes through glass tubes containing a laser rod and a pumping lamp, respectively, and through a waterway disposed in the oscillator block.

The temperature of water flowing out of the laser oscillator 14 has raised by about few degrees centigrade, and this water is supplied to a secondary inlet 76a of the heat exchanger 76 where the water is cooled to, for example, 25 degrees centigrade by undergoing a heat exchange with the primary cooling water. The (secondary) cooling water flows out of the secondary outlet 76b of the heat exchanger 76, and to the inlet 38a of the tank 38 i.e., the inlet 72a of the ion exchanger 72. The ion exchanger 72 containing ion exchange resin deionizes the cooling water. The cooling water flows out of the ion exchanger 72 and then passes through the filter 74 within the storage tank 38. The filter 74 removes organic materials etc., from the cooling water. Then the cooling water is drawn by the pump 78 back to the laser oscillator 14.

A thermosensor 82, pressure sensor 84 and electric conductance sensor 86 are connected in the piping between the pump 78 and the laser oscillator 14 to monitor the temperature, pressure and electric conductance, respectively, of the cooling water supplied to the laser oscillator 14. An electric motor 88 drives the pump 78. An electromagnetic flow control valve 90 is connected in a primary cooling water (commercial water) supply line J4 to a primary inlet 76c of the heat exchanger 76. A flow switch 92 detects the flow of the secondary cooling water in the pipe line J3 between the heat exchanger 76 and the tank 38. A drain 94 is used to discharge cooling water from the tank 38.

Figure 4:
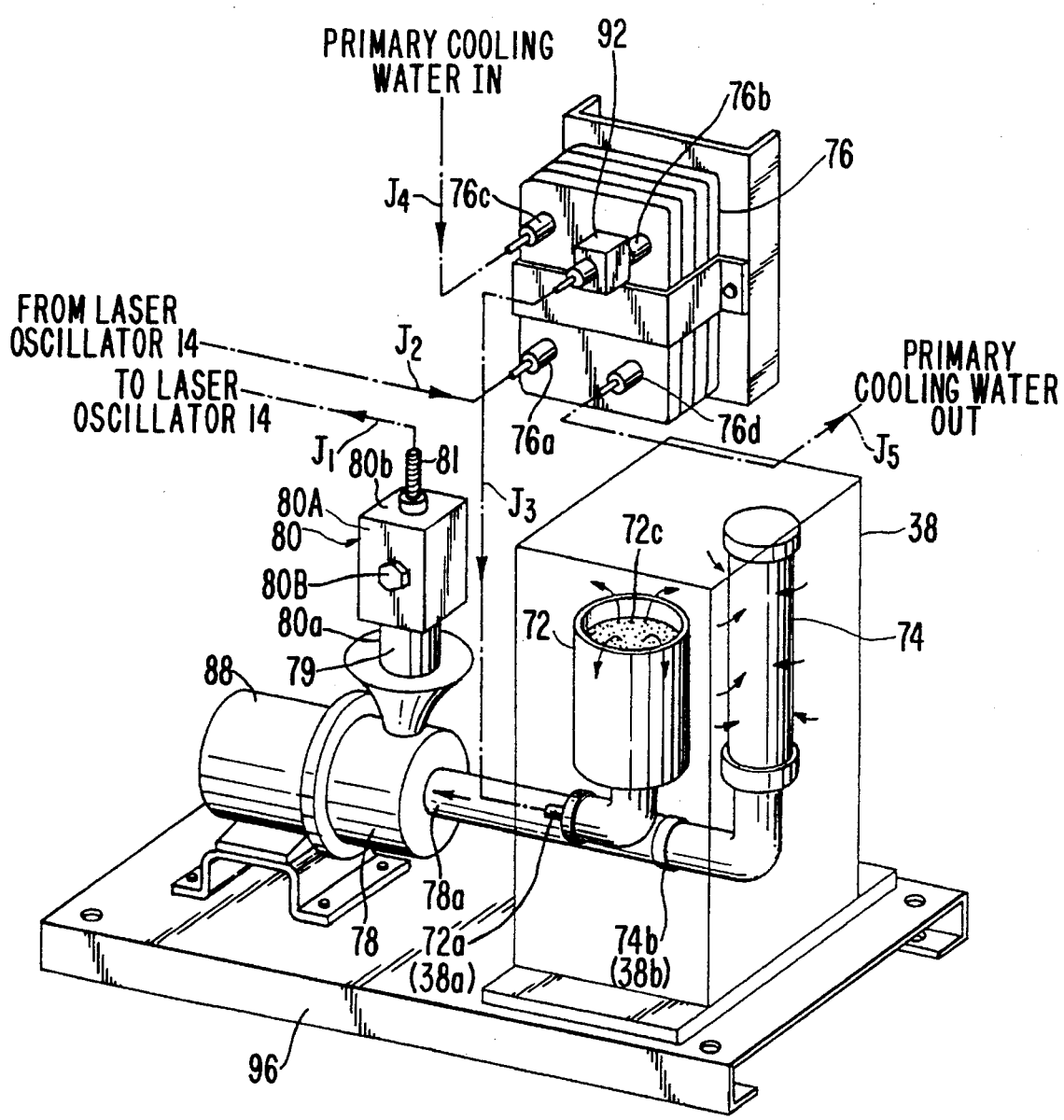
FIG. 4 is a perspective view of a main portion of the cooling apparatus.

FIG. 4 is a perspective view of the main part of the cooling apparatus. The storage tank 38, pump 78 and motor 88 are mounted on a base 96 fixed on the bottom surface of the laser apparatus in the left side of the lower unit 12.

The tank 38 is made from a transparent material to permit visual inspection of the water level, ion exchanger 72 and filter 74 within the tank.

The ion exchanger 12 has a top opening through which the deionized cooling water flows out. The ion exchanger 72 is filled with an ion exchange resin which is retained in a permeable or meshed bag (e.g., of nylon). Unlike the prior art cartridge type requiring a separate and dedicated housing, the ion exchanger 72 of the present cooling apparatus is housed in the water storage tank 38 whose volume is much larger than that of the dedicated housing. Thus, the ion exchanger 72 deals with the cooling water flow corresponding to that passing through the laser oscillator 14, thus improving the efficiency of deionizing.

The filter 74 comprises a cylindrical filtering material (e.g., polypropylene/cotton) which is uncovered. The cooling water flowing out of the ion echanger 72 stays within the tank 38. Then the cooling water permeates through the cylindrical filtering material from the periphery there to an internal waterway formed in the center of the filter 74 and extending to the outlet 74b of the filter. Unlike the prior art cartridge type, the filter 74 of the present cooling apparatus does not require a separate and dedicated housing, and i thus less expensive. In FIG. 4, pipes J1–J5 are simply indicated by dashed lines.

Figure 5:
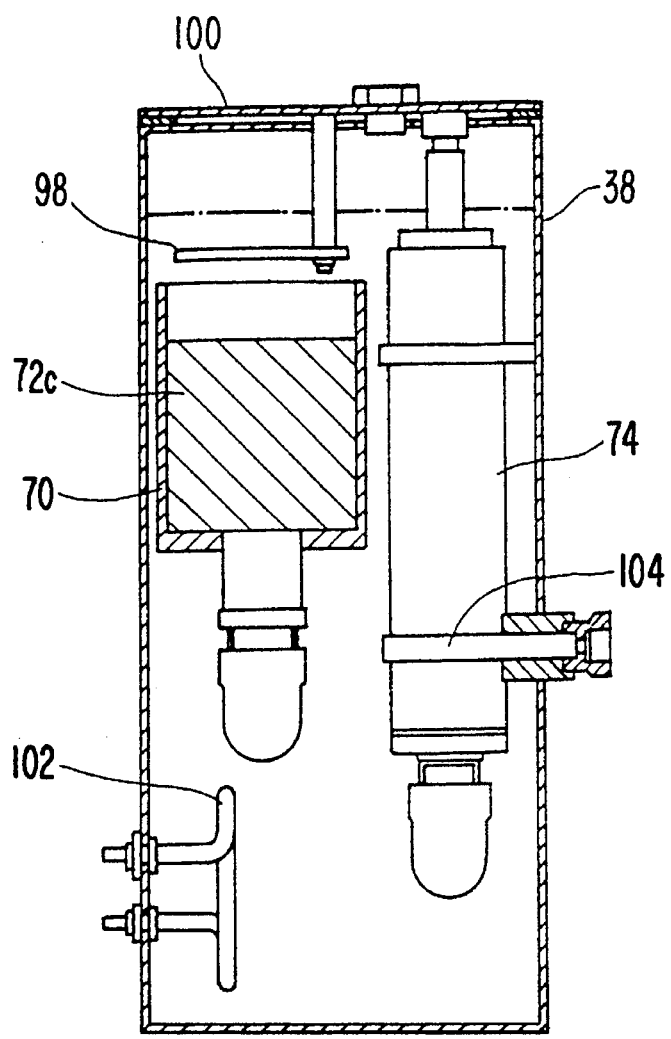
FIG. 5 is a sectional view of a storage tank containing an ion exchanger and a filter in accordance with the invention.
Figure 6:
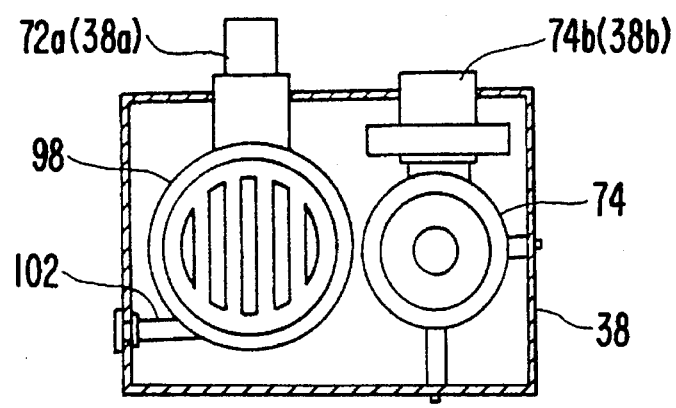
FIG. 6 is a top view of the storage tank.

FIGS. 5 and 6 are respectively elevational section and top views of the tank 38. A stop leaf 98 is disposed near the top opening of the ion exchanger 72 to prevent the meshed bag 72c containing the ion exchange resin from getting out of the ion exchanger 72. Any other suitable stop member may be used. A heater 102 and a thermometer 104 are disposed in the tank 38 to keep the temperature of the cooling water in the tank to, say, 30 degrees centigrade.

As is apparent, the present cooling apparatus is arranged such that both the ion exchanger 72 and filter 74 for purifying the cooling water to maintain its electric insulation by removing ions and organic materials are commonly housed in the storage tank 38 in which the ion exchanger 72 inlet 72adefines the tank inlet 38a, and the filter 74 outlet 74a defines the tank outlet 38b.

The provision of the ion exchanger 72 and the filter 74 within the storage tank 38 eliminates the need for an exclusive space for the ion exchanger 72 and the filter 74, thus greatly contributing to the downsizing of the entire cooling apparatus.

Since the storage tank 38 serves as a common housing of the ion exchanger 72 and the filter 74, no separate housings are required for the ion exchanger 72 and the filter 74, thus creating cost savings. The ion exchanger 72 allows a larger volume of the cooling water to pass therethrough than in the prior art in which a separate housing is used for the ion exchanger. Thus, the ion exchange performance is improved without the need of a plurality of ion exchangers connected in parallel with one another.

The tank 38 provides direct communication between the ion exchanger 72 and the filter 74, thus eliminating the need for pipes and joints between the outlet of the ion exchanger 72 and the inlet of the filter. Further, the inlet 72aof the ion exchanger 72 serves also as the inlet 38a of the tank 38, and the outlet 74b of the filter 74 simultaneously serves as the outlet 38b of the tank 38 so that common pipes and joints are used for these ports. The relatively low number of pipes, joints and fittings not only creates cost savings but also eliminates or minimizes leakage of water. Thus the apparatus is highly reliable.

The transparent tank 38 permits visual inspection of the interior of the tank such as inspection of the internal water level and discoloration or deterioration of the ion exchange resin without the need of opening the tank cover 100.

In place of the ion exchange resin, any of other ion exchange materials such as an ion exchange membrane and ion exchange cellulose may be used.

An additional feature of the present laser oscillator cooling apparatus will now be described with reference to FIGS. 4 and 7–11. In FIG. 4, the motor 88 may comprise a single phase alternate current (AC) motor energized by a commercial electric power of, say, 200 V applied by way of the electric cable 70 (FIG. 2) and the electric power supply terminal. The motor 88 drives the pump 78 so as to rotate at a speed that is a function of the applied electric power frequency. The pump 78 produces a water pressure in the water passage as a function of the revolution speed, and therefor the commercial power frequency, to draw the cooling water with such pressure from the tank 38 to the flow restricting valve 80. The flow restricting valve 80 has a box-shaped valve body 80A. An interchangeable flow restricting member 80B is detachably mounted on a surface of the valve body 80A. An inlet 80a of the valve body 80A is connected to an outlet of the pump 78 through a joint 79. An outlet 80b of the valve body 80A is connected to an end of a pipe J1 through a fitting 81. The other end of the pipe J1 is connected to an inlet of the laser oscillator 14.

Figure 7:
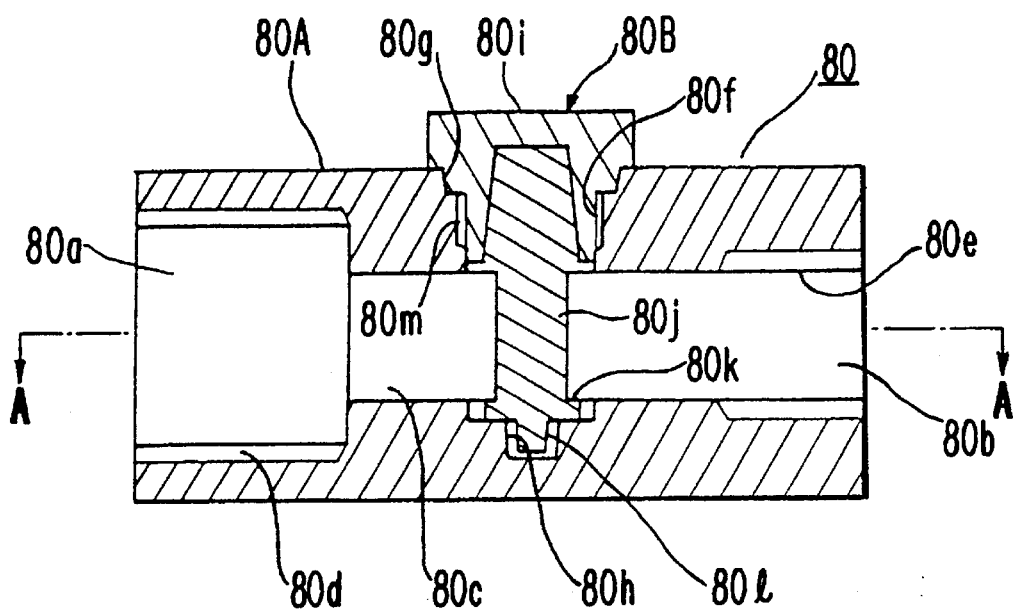
FIG. 7 is a sectional view of a flow restricting valve in accordance with the invention.
Figure 8:
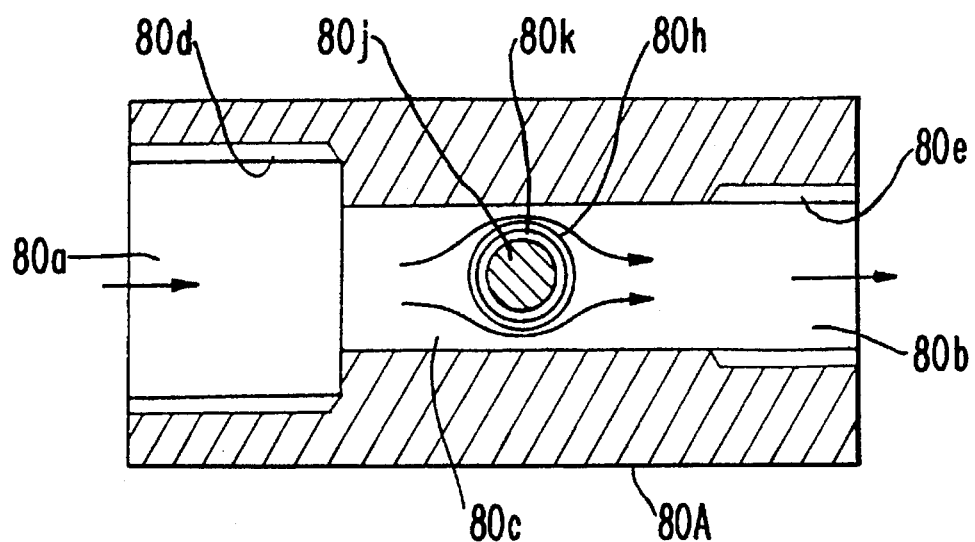
FIG. 8 is a sectional view taken along line A—A in FIG. 7.

FIGS. 7 and 8 show the internal structure of the flow restricting valve 80. A tunnel-shaped water passage 80c is formed within the valve body 80A. An internal annular wall extending from the valve inlet 80a is formed with threads 80d for fitting with the joint 79 connected to the pump 78. An internal annular wall extending to the valve outlet 80b is formed with threads 80e for fitting with the joint 81 connected to the pipe J1. An opening 80g with threads 80f is formed on a side of the valve body 80A. An interchangeable flow restricting member 80B is mounted in the opening 80g. An internal surface of the valve body 80A is formed with a step 80h in a position opposite to the opening 80g to receive the tip of the flow restricting member 80B.

The flow restricting member 80B comprises a knob 80i, a flow restricting element or stem 80j, a flange 80k and a projection 80l. The knob 80i has a neck with a diameter corresponding to that of the opening 80g of the valve body 80A. The neck is formed with threads 80m to be engaged with threads 80f defining the opening 80g. The flow restricting stem 80j has the form of a rod having a diameter that is a function of the power frequency, and extends across the water passage 80c between the opening 80g and the step 80h of the valve body 80A. The flange 80k and projection 80l engage the step 80h of the valve body 80A to hold the flow restricting stem 80j against the pressure of the cooling water.

In FIG. 8, the cooling water from the pump 78 enters the inlet 80a and moves around the flow restricting stem 80j as indicated by arrows to the outlet 80b. The cross sectional area of the water passage is reduced by the flow restricting stem 80j such that flow rate of the cooling water is limited in proportion to the diameter of the flow restricting stem 80j.

Figure 9A:
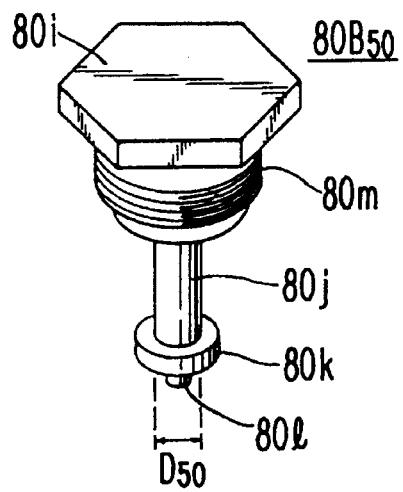
FIGS. 9(A) and 9(B) are perspective views of interchangeable flow restricting members in accordance with the invention.
Figure 9B:
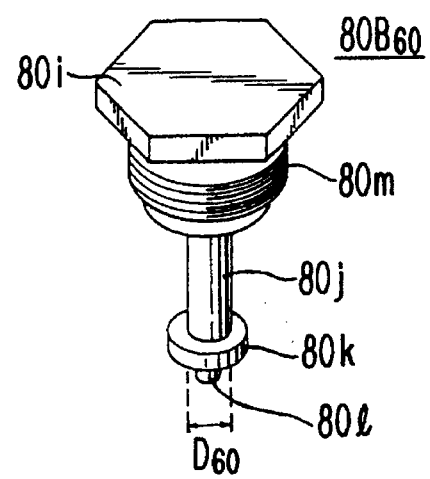

As shown in FIG. 9, the present cooling apparatus interchangeably uses either a flow restricting member 80B50 having a relatively small diameter D50 for a 50 Hz power frequency or a flow restricting member 80B60 having a relatively large diameter D60 for a 60 Hz power frequency. An appropriate one of the interchangeable flow restricting members 80B50 and 80B60 is chosen and attached to the valve body 80A in accordance with the AC power frequency supplied to the motor 88.

In the case of a 60 Hz power frequency, the pump 78 rotates faster than that in the case of a 50 Hz power frequency, producing a correspondly higher water pressure. However, in the 60 Hz case, the flow restricting stem 80j has a larger diameter than that of the stem used in the case of the 50 Hz power frequency. Conversely, in the case of the 50 Hz power frequency, the pump rotates slower and generates a lower water pressure whereas the diameter D50 of the flow restricting stem 80j, which is smaller than the diameter D60, provides a smaller resistance to the water flow. Thus, an appropriate ratio of diameters D50 and D60 of the respective flow restricting stems 80j may be chosen such that either the flow restricting member 80B50 mounted in the case of a 50 Hz power frequency or the flow restricting member 80B60 mounted in the case of a 60 Hz power frequency results in the same flow rate of the cooling water supply to the laser oscillator 14.

FIGS. 10(A), 10(B) and 11(A), 11(B) show modifications of the interchangeable flow restricting member 80B.

Figure 10A:
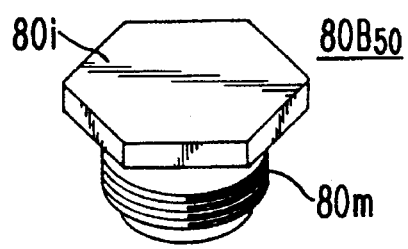
FIGS. 10(A) and 10(B) are perspective views of modified flow restricting members.
Figure 10B:
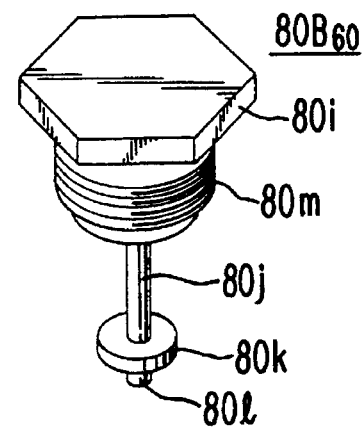

The first modification of FIGS. 10(A) and (B) has a flow restricting member (blind member) 80B50 having only a knob 80i without any flow restricting stem (FIG. 10(A)) mounted in the case of 50 Hz power frequency, and a flow restricting member 80B60 with a flow restricting stem 80j (see part (B) in FIG. 10) mounted in the case of 60 Hz power frequency. The diameter D60 of the flow restricting stem 80j of the flow restricting member 80B60 is chosen such that the member 80B60 produces a desired flow rate of the cooling water identical with that obtained with the blind member 80B50 used under the condition of a 50 Hz power frequency.

Figure 11A:
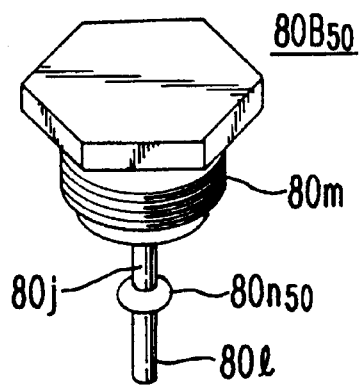
FIGS. 11(A) and 11(B) are perspective views of further modified restricting members.
Figure 11B:
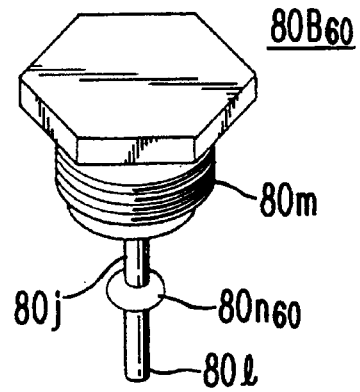
Figure 12:
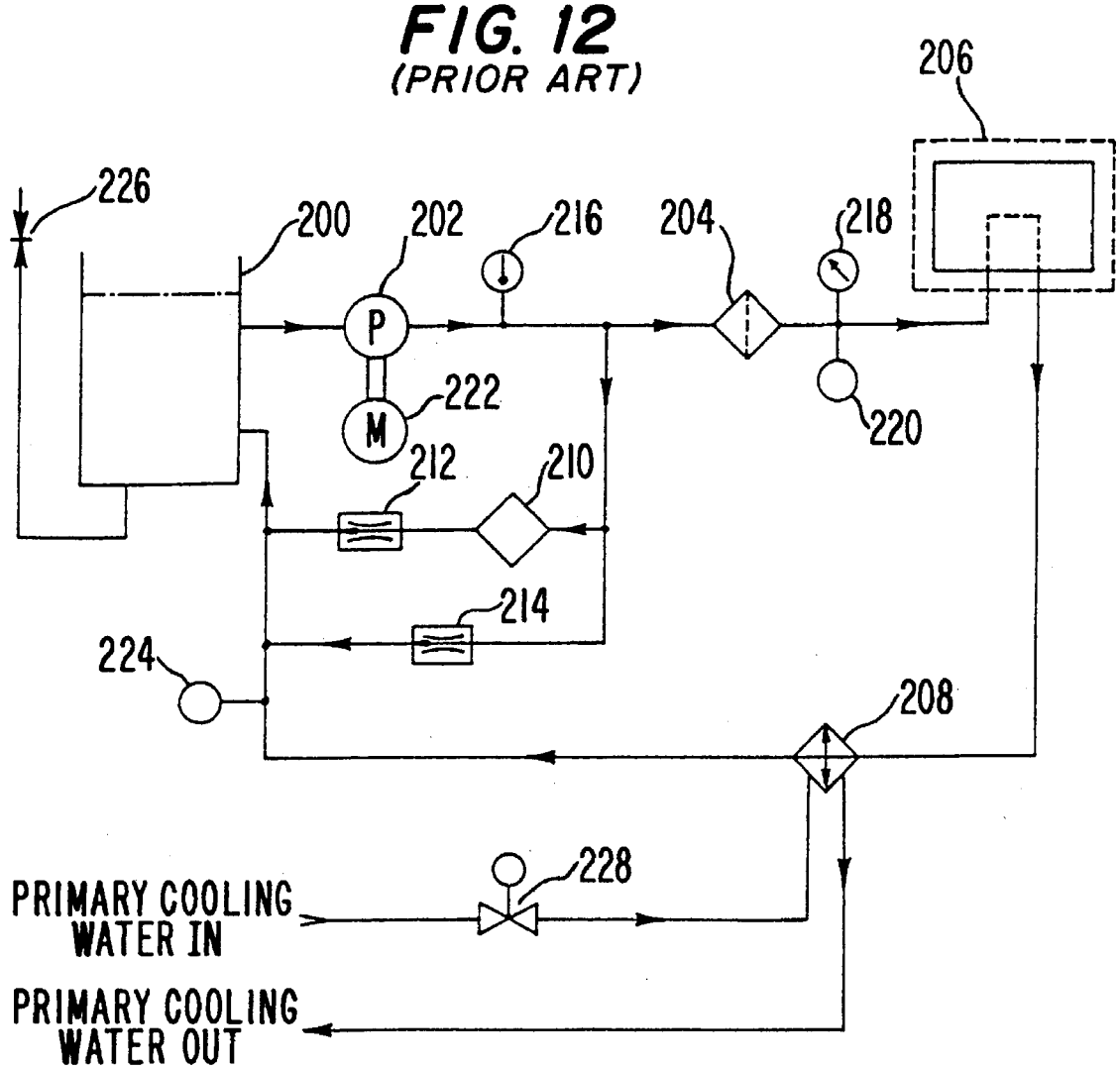
FIG. 12 shows an overall arrangement of the prior art laser oscillator cooling apparatus.

In the second modification of FIGS. 11(A) and 11(B), a flow restricting stem 80j has a block midway along the stem thereof. The dimension of the block is relatively large in the case of a 50 Hz power frequency, as denoted by 80n50 shown in FIG. 11(A) whereas it is relatively small for a 60 Hz power frequency, as designated by 80n60 in FIG. 11(B). An appropriate one of the flow restricting members 80B50 and 80B60 is chosen and mounted to provide a desired flow rate of the cooling water supply identical in both cases of 50 and 60 Hz power frequencies. In the second modification, the stop of the flow restricting member takes the form of a projection 80l without any flange 80k. In this connection, the recess 80h in the valve body 80A has a shape large enough to just receive the flangeless projection 80l.

In the embodiments, the stop (80k, 80l) is provided to hold the flow restricting stem or element 80j. Such stop may be omitted if the knob 80i is sufficiently fastened within the opening 80g of the valve body 80A. The flow restricting element may also take any other suitable shape. In the embodiment, the flow restricting valve is positioned in a pipe at the outlet of the pump 78, but it may be placed anywhere in the piping through which the cooling water circulates.

As should be apparent from the foregoing, interchangeable flow restricting members are provided for different rotary speeds of the pump which pressurizes the cooling water supplied to the laser oscillator. A change in the pressure of the cooling water due to the change in the pump speed is compensated for by simply choosing and connecting an appropriate one of the interchangeable flow restricting members in the piping through which the cooling water is circulated to the laser oscillator. In doing so, the present cooling apparatus achieves the desired flow rate of the cooling water so that the cooling effect on the laser oscillator is kept constant to thereby assure a satisfactory performance of the laser oscillator.

The present invention can be applied to a laser apparatus of the type having a laser oscillator which is separate from the main unit of the apparatus. In that case, an electric terminal and pipe connecting port for connecting with the separate laser oscillator are disposed in the front of the apparatus together with the external electric terminal and the external pipe connecting port. The present invention can also be applied to laser apparatus other than a laser beam machining apparatus and to a laser oscillator other than a solid state laser.

What is claimed is:

1. A laser system comprising:

an upper unit including a laser oscillator;

a lower unit integral with said upper unit, said lower unit including a compartment, power supply means for supplying electric power to said laser oscillator and cooling means for supplying cooling water to said laser oscillator disposed in said compartment side by side as spaced horizontally from one another, and a front panel mounted at the front of said compartment, said front panel being manually openable and closable to expose and cover the power supply means and the cooling means disposed in said compartment;

said cooling means including an ion exchanger which deionizes the cooling water, a filter which removes undesired materials from the cooling water, a storage tank in which the cooling water to be supplied to said laser oscillator is stored, piping connecting and forming a circuit with said laser oscillator and said storage tank, a pump which circulates the cooling water between said laser oscillator and said storage tank via said piping, and an external port connected to said piping and disposed at the front of said lower unit behind said front panel;

said ion exchanger and said filter being located in said storage tank below a normal level to which water fills the tank, said ion exchanger having an inlet connected to said piping and through which the cooling water enters said tank so as to form an inlet of said tank, and said filter having an outlet from which the cooling water flows out of said tank to said piping so as to form an outlet of said tank, and said ion exchanger having an outlet located in said tank such that cooling water flowing therefrom passes to said filter located in said tank; and said power supply means including an external terminal disposed at the front of said lower unit behind said front panel.

2. A laser system comprising:

an upper unit including a laser oscillator;

a lower unit integral with said upper unit, said lower unit including a compartment, power supply means for supplying electric power to said laser oscillator and cooling means for supplying cooling water to said laser oscillator disposed in said compartment side by side as spaced horizontally from one another, and a front panel mounted at the front of said compartment, said front panel being manually openable and closable to expose and cover the power supply means and the cooling means disposed in said compartment;

said cooling means including an ion exchanger which deionizes the cooling water, a filter which removes undesired materials from the cooling water, a storage tank in which the cooling water to be supplied to said laser oscillator is stored, piping connecting and forming a circuit with said laser oscillator and said storage tank, a pump which circulates the cooling water between said laser oscillator and said storage tank via said piping, and an external port connected to said piping and disposed at the front of said lower unit behind said front panel;

said ion exchanger and said filter being located in said storage tank below a normal level to which water fills the tank, said ion exchanger having an inlet connected to said piping and through which the cooling water enters said tank so as to form an inlet of said tank, and said filter having an outlet from which the cooling water flows out of said tank to said piping so as to form an outlet of said tank, and said ion exchanger having an outlet located in said tank such that cooling water flowing therefrom passes to said filter located in said tank; and said power supply means including an external terminal disposed at the front of said lower unit behind said front panel; and interchangeable flow restricting means for obtaining a constant flow rate of the cooling water through said piping to said laser oscillator irrespective of the rotary speed of said pump which changes depending on the commercial frequency of electric power supplied to drive said pump;

said interchangeable flow restricting means including a valve body having a sidewall defining a valve inlet and a valve outlet connected to said piping, and a tunnel-like passage extending between said valve inlet and said valve outlet, a threaded opening extending through said side wall, a recess extending in said side wall opposite to said threaded opening, and flow restricting members each comprising a knob having threads engageable with threads of said threaded opening, and at least one of which flow restricting members includes a flow restricting stem which extends across said water passage between said opening and said recess when the threads of said knob are engaged with the threads of said threaded opening, and a stop disposed on an end portion of said flow restricting stem to be received within said recess dimensions of said flow restricting stem corresponding to a respective commercial frequency of electric power.

3. A laser cooling system for cooling a laser oscillator, said system comprising:

an ion exchanger which deionizes cooling water;

a filter which removes undesired materials from the cooling water;

a storage tank which stores the cooling water to be supplied to a laser oscillator;

piping configured to form a circuit with the laser oscillator and said storage tank;

a pump which circulates the cooling water through said circuit; and said ion exchanger and said filter being located in said storage tank, said ion exchanger having an inlet connected to said piping and through which the cooling water enters so as to form an inlet of said tank, and said filter having an outlet from which the cooling water flows out of said tank to said piping so as to form an outlet of said tank, and said ion exchanger having an outlet located in said tank such that cooling water flowing therefrom passes to said filter located in said tank.

4. A laser cooling system for cooling a laser oscillator, said system comprising:

a storage tank which stores cooling water to be supplied to a laser oscillator;

piping configured to form a circuit with the laser oscillator and said storage tank;

a pump which circulates the cooling water through said circuit; and interchangeable flow restricting means for obtaining a constant flow rate of the cooling water through said piping irrespective of the rotary speed of said pump which changes depending on the commercial frequency of electric power supplied to drive said pump;

said interchangeable flow restricting means including a valve body having a sidewall defining a valve inlet and a valve outlet connected to said piping, and a tunnel-like passage extending between said valve inlet and said valve outlet, a threaded opening extending through said side wall, a recess extending in said side wall opposite to said threaded opening, and flow restricting members each comprising a knob having threads engageable with threads of said threaded opening, and at least one of which flow restricting members includes a flow restricting stem which extends across said water passage between said opening and said recess when the threads of said knob are engaged with the threads of said threaded opening, and a stop disposed on an end portion of said flow restricting stem to be received within said recess dimensions of said flow restricting stem corresponding to a respective commercial frequency of electric power.

* * * * *